United States Patent [19]
Chisum

[11] 3,951,187
[45] Apr. 20, 1976

[54] MACHINE TO PREPARE LOGS FOR LOG HOUSES

[76] Inventor: Finis Lavell Chisum, Rte. 5, Woodcrest Heights, Claremore, Okla. 74017

[22] Filed: Apr. 24, 1975

[21] Appl. No.: 571,373

[52] U.S. Cl. .............................. 144/1 R; 144/36; 144/312
[51] Int. Cl.$^2$ ..................... B27C 1/08; B27C 1/00
[58] Field of Search ............ 144/1 R, 36, 37, 208 F, 144/209 A, 311, 245 B, 312, 326 R; 82/45

[56] References Cited
UNITED STATES PATENTS

| | | | |
|---|---|---|---|
| 2,263,036 | 11/1941 | Flateboe | 144/209 A X |
| 3,010,495 | 11/1961 | Ipsen | 144/208 F X |
| 3,016,074 | 1/1962 | Baker | 144/208 F |
| 3,457,978 | 7/1969 | Ahlstedt | 144/1 R X |
| 3,752,201 | 8/1973 | Heth | 144/209 A |
| 3,848,647 | 11/1974 | Fell | 144/1 R X |

*Primary Examiner*—Al Lawrence Smith
*Assistant Examiner*—Gary L. Smith
*Attorney, Agent, or Firm*—Head & Johnson

[57] ABSTRACT

A machine for processing wood logs for construction of log houses. The machine includes a power feed to load the logs into a self-centering device. A carriage assembly is centered about the log and the log is mounted in the carriage on powered centers so that the log can be rotated. The carriage travels longitudinally on tracks past one, or a plurality of cutters, which as the log rotates cuts the log down to a selected diameter. After the log is cut to diameter it is again passed longitudinally along the tracks and two cutters are positioned at equal distance above and below the axis of the log to cut tongues and grooves on the top and bottom of the log, respectively. Means are provided for cutting a saddle notch underneath the log, to cut the logs to precise length, and to cut a vertical notch in each end for the purpose of joining logs end to end. Means are provided for rapid removal of the chips cut from the logs.

21 Claims, 10 Drawing Figures

MACHINE TO PREPARE LOGS FOR LOG HOUSES

BACKGROUND OF THE INVENTION

This invention lies in the field of housing construction and preparation of lumber therefor. More particularly, it concerns the preparation of cylindrical logs of selected diameters and lengths, prepared so that they can be rapidly set up in the form of walls of a house or building.

In the days before the development of suitable saw mills for the preparation of board lumber for the construction of homes, logs were cut by hand to be more or less of a selected cylindrical size and were fitted together by means of saddle notches, etc. to provide an enclosure for the purpose of protection from the weather, etc.

The construction of a house in the form of a log cabin has notable advantages, particularly in the strength and rigidity of the structure and in the thermal insulation provided by the thick wood logs. However, because of the difficulty of providing truly cylindrical logs, properly fitted with tongues and grooves so as to seal against the weather, the construction of houses by the use of sawed lumber advanced while the construction of log cabins terminated.

However, there are certain advantages in the use of a log cabin for style and comfort, but also in the fact that in many wilderness areas where industry requires the attendance of a number of people, it is difficult to provide the kind of saw mill required to cut logs to the proper lumber size for conventional housing construction.

This invention describes a self-contained simple apparatus for efficiently handling logs of various diameters and lengths for the preparation of cylindrical logs modified with tongue and groove surfaces on top and bottom respectively, for the construction of homes or buildings. Such a self-contained apparatus is simpler and cheaper than the conventional type of saw mill and is therefore well adapted to be carried into wilderness areas for the construction of housing, particularly where there is plenty of timber of suitable size, etc.

In the prior art, logs have been prepared for the construction of log houses by the use of a more or less conventional lathe, in which the raw log was clamped between centers and rotated by the lathe head. Cutters were provided to travel along the lathe bed to cut the log down to a selected diameter. The logs were then moved to and put on a milling machine which was used to cut the flats on top and bottom and to provide the tongue and groove construction as desired. The logs were then moved to a third location to cut the saddle notches and to cut them to precise length, etc. All of this required separate handling and transport, was expensive and required considerable man power and machinery, and was therefore too expensive to be used commercially in competition with commercial housing construction.

SUMMARY OF THE INVENTION

It is a primary object of this invention to provide a self-contained machine for the complete machining of logs into finished log timbers, for the construction of log houses and buildings. It is a further object of this invention to provide a machine for the complete machining of logs for log houses without separate manual handling.

It is a still further object of this invention to provide means for turning the logs to a selected diameter; to provide separate means for collecting the chips of the bark of the logs, and the chips of the white wood of the logs, since these are marketed separately; means to machine top and bottom surfaces of the log to provide adequate parallel seating of logs on top of each other and to provide and seal against the weather by means of appropriate tongue and groove construction; means to cut saddle notches, at desired locations, of various selected diameters; means to cut the logs to proper length, and to cut vertical notches in the ends of logs for the purpose of inserting door jams and windows, etc.

These and other objects are realized and the limitations of the prior arts are overcome by providing a unitary construction including a long pair of rails, rigidly mounted on a base structure. The length of the rails is somewhat longer than twice the length of the longest log to be prepared. A carriage is provided to run on the two parallel rails and the carriage is long enough to extend beyond the maximum length of the logs to be machined.

Means are provided for loading raw logs onto a platform and moving one log at a time horizontally, onto the machine, where they are loaded in a self-centering device. This device lifts the log up from below, and centers the log with the centers mounted on the carriage. The centers are pressed into the ends of the log and means are provided for rotating the centers so as to rotate the log at any selected speed.

Cutters are provided beneath the log, adjustable in distance from the axis of the log, so that by rotation of the log, rotation of the cutters, and translation of the carriage, the logs can be cut down to a cylindrical shape of selected diameter.

After the log is cut to a constant diameter, a second pass of the carriage is made past a pair of cutters, one above and one below the log. The cutters serve to cut flats on top and bottom with appropriate tongues and grooves for interlocking each of the logs in a vertical panel.

The log at this state is supported on a vertically moving table so that it can be released from the centers and dropped down, to permit the passage of the carriage, which then proceeds to accept a second log, etc. The finished log is then passed to a cutter for cutting the saddle notches, for cutting the ends to selected length, and to cut the vertical notches, all at one station, after which the log is carried on rollers at the end of the machine and is transported to a storage area.

BRIEF DESCRIPTION OF THE DRAWING

These and other objects and advantages of the invention and a better understanding of the principles and details of the invention will be evident from the following description taken in conjunction with the appended drawings in which:

FIGS. 8A, 8B, 8C illustrate various details in cross-section of the finished logs.

DESCRIPTION OF THE PREFERRED EMBODIMENT

Figure 1:
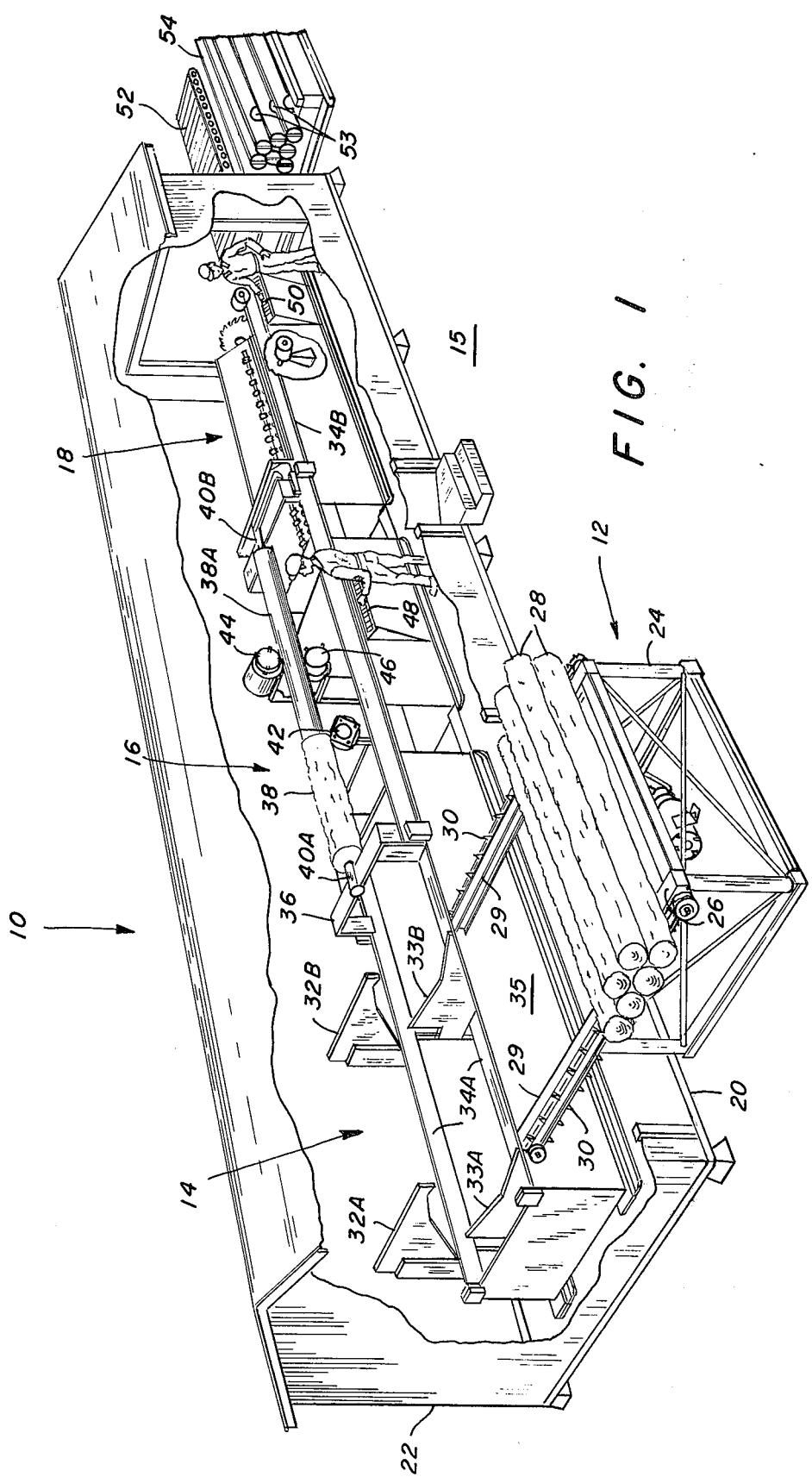
FIG. 1 is a generalized view of the entire machine and and its operation.

Referring now to the drawings and in particular to FIG. 1, there is illustrated generally by the numeral 10 the overall machine for the presentation of logs for building log cabins. The numeral 12 indicated generally the log input portion of the machine. The numeral 14 indicates generally the portion of the machine utilized for the loading of a log and centering it between centers on the carriage. Numeral 16 illustrates generally the portion of the machine utilized for the cutting of the log down to a selected diameter, and for cutting the top and bottom surfaces for proper tongue and groove construction. Numeral 18 indicates generally the portion of the machine which carries out the cutting of the saddle notches and prepares the ends cut to selected length and cut with vertical notches, for purposes of joining logs end to end, etc.

The logs 28 are loaded by any means onto a loading platform 26 which is carried on suitable legs 24. There is a horizontal track 29 with suitable motor driven chain 30 that carries the logs horizontally until they are over the first track 34A of the machine, and they then are rolled into a pair of centering devices 33A and 33B. The parts 33A and 33B co-act with appropriate parts 32A and 32B, as will be explained in conjunction with FIG. 3, so that as the parts 33 move upward, the parts 32 move downward, to grasp the log and center it with respect to a travelling carriage 36 which runs on the rails 34A and 34B. 34A and 34B are extensions, one of the other, and are numbered separately since they cover different portions of the machine where different operations are carried out. The carriage 36 is capable of running the full length of the machine.

After the log is loaded into the parts 33A and 33B of the self-centering device, the carriage is moved to the left until it is directly over the log, and then the centering devices 33, and 32 are brought into action to lift the log and center it with respect to appropriate centers 40A and 40B mounted on the carriage 36. The two centering devices 32A and 32B, etc. are independently acting so that even though the log that they are grasping is of a tapered form, it will be centered so that the axis of the log will be colinear with the centers 40A and 40B of the carriage. The centers are then pressed into the wood so that the log is supported entirely by the centers and the carriage. The parts 32, 33 are then retracted. As will be described in FIG. 3 there is a power drive on one of the centers, so that the log can be rotated at any selected speed.

One or more cutters 42 is brought upward into contact with the log and rotated at high speed, while the log itself is rotated, so that a long, smooth, cylindrical log is provided out of the rough log, etc. There may be more than one cutter as will be explained in connection with FIG. 4, and the speed of drive, etc. are variable to suit each condition.

It is generally desirable to separate the bark chips from the white wood chips. Both of these are useful in different applications, and are therefore marketable, if they are collected separately. This machine has provision for collecting separately the bark chips and the white wood chips as will be explained later. On the first pass of the carriage to the right, the log 38 as shown in FIG. 1 is cut down from its original rough diameter down to a selected smooth diameter 38A. The carriage is then brought back to the left, and then makes a second pass to the right. While it moves to the right, cutters 44 and 46 are brought into contact with the top and bottom of the log. These are rapidly rotating multibladed cutters which are shaped so as to provide a cross-section of the log such as shown in FIGS. 8A and 8B, and these will be explained later. The cutters 44 and 46 are provided on a self-centering device, so that the top and bottom surfaces are positioned precisely with respect to the axis of the cylindrical log 38A.

At the end of this machining operation, the carriage is in the extreme position to the right. At that point a table is brought up from below to support the log so that the centers can be withdrawn, and then with the log resting on the table, the table is lowered so as to clear the carriage, which then moves back to the left, ready to pick up a second log, which has already been loaded onto the self-centering device. The machined log, while on the table at the right end of the machine, is clamped to the table. The saddle notch is cut, the ends are cut, and the ends are notched with a vertical notch, if desired, as will be explained in conjunction with FIGS. 5 and 6.

After these operations, the log is rolled out on a roller table 52 and can be stacked or carried to a warehouse, etc. Since there are two principle types of operations, there are two sets of controls 48, which handles the first two operations of debarking and of cutting the tongues and grooves, and the other station 50 prepares the end cuts, etc. The logs 54 show the saddle cuts 53 so that, as will be explained in connection with FIG. 2, the logs can be crossed, one over the other. The ground surface is indicated by numeral 15. The base of the machine can rest directly on the ground, or on a suitable foundation.

Figure 3:
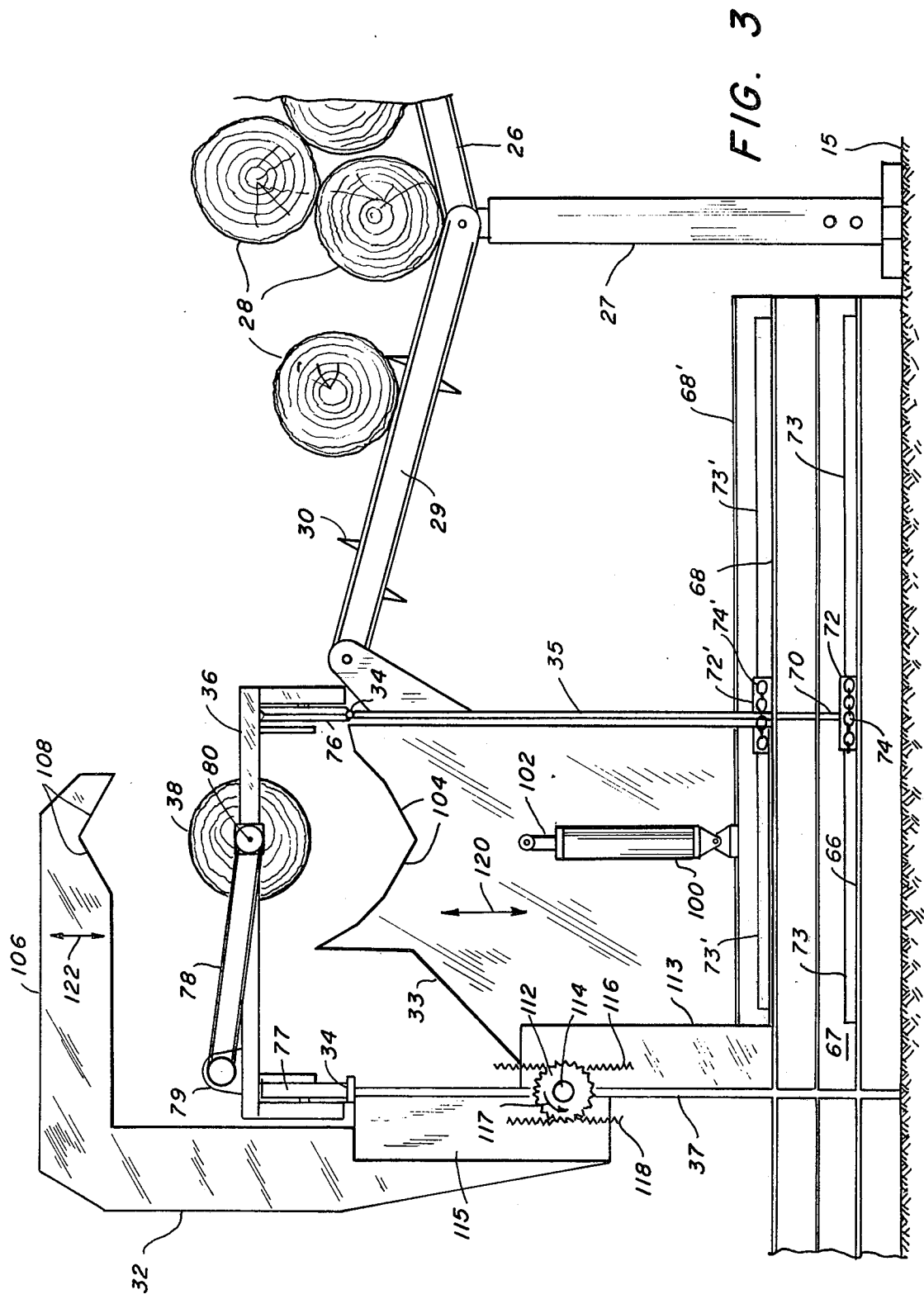
FIG. 3 illustrates the end view of the log handling apparatus and the self-centering means.
Figure 4:
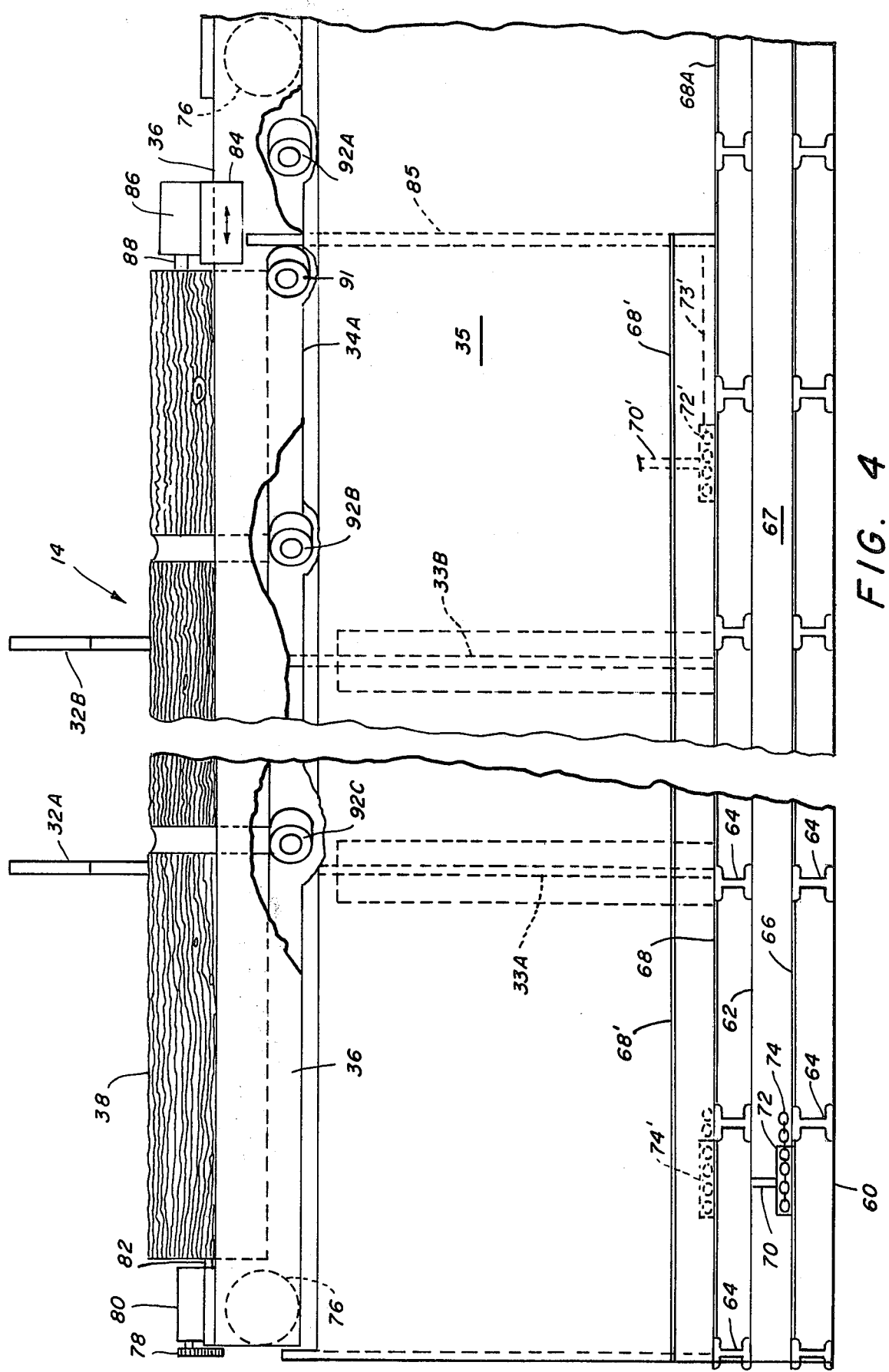
FIG. 4 illustrates the condition with the log on the carriage and rotated against cutters.

Refer now to FIGS. 3 and 4. FIG. 3 shows an end view of the loading apparatus and the self-centering devices, while FIG. 4 shows a longitudinal view of the carriage, the log on the carriage, and the self-centering devices.

A table 26 is provided resting on legs 27, resting on the ground 15, onto which rough logs 28 can be piled. There is a chain or belt system, well-known in the art and motor driven (not shown), by means of which logs can be individually carried up the slight incline 29, and loaded into the notch 104 of the lower half 33 of the self-centering mechanism. The part 33 is a vertical plate, which is operated in vertical guides which are indicated generally by the boxes 113, 115, which are well-known in the art. A hydraulic cylinder 100 and piston 102 are provided for moving the part 33 vertically up and down in accordance with the arrows 120. Similarly, the part 32 held in guides 115 moves up and down also. It has an overhanging arm 106 and a suitable notch 108 and moves in accordance with arrows 122. It is desired, that as the part 33 moves up, the part 32 moves down an equal distance, so that a cylindrical log will be centered between the notches 104 and 108.

There are many ways in which the centering can be taken care of. One way is to provide a rack indicated schematically as 116, on the part 33, and a corresponding rack 118 on the part 32, with a pinion 112 turning in a fixed shaft 114. Now as the part 33 moves upward the pinion 112 will turn counterclockwise, in accordance with the arrow 117, and will draw down the part 32 by means of the rack 118 an equal distance to the upward movement of the part 33. Of course, there are other ways including linkages, or cables, or chains, by means of which this up and down motion can be provided simultaneously. The important point being that by suitable shape of notches 108 and 104, (including a horizontal edge for 108), a log of any diameter can be positioned with its axis corresponding to that of the center 80 on the carriage 36. Thus with a very minimum of handling the log is rolled off the loading platform into the notch 104, is lifted up and is correspondingly clamped at the top, in the precise position so that when the center 80 is pressed longitudinally into the log and the corresponding center at the other end of the log, the log will be held on centers, at its axis, so that rotation can then be provided for machining the outer bark and preparing a log of selected cylindrical size. Means such as a chain 78 can be provided with motor 79 to rotate the log at any selected speed, which is well-known in the art.

The carriage 36 has a pair of wheels at each end such as 76 and 77. The wheel 76 is notched like a pulley, and runs on an edge, which gives lateral guidance. The other wheel 77 runs on a flat top rail, so that the lack of alignment between the two rails does not provide any serious operational difficulties.

There is shown in FIG. 4 and likewise in FIG. 3 two structural steel floors prepared with I beams, for example, or other structural shapes, indicated by numeral 64, and a plate 66 covering the lower floor. A similar surface covers a part of the upper floor. The surface 68' and 68A can be an open grillwork, or made in the form of slats, etc. so that the bark and other chips that are cut can fall down through the openings in the surfaces 68' and 68A, down to the plates 68 and 66 respectively. In the spaces 67 and 67' between the floors, there is a vertical shaft 70 carrying sprocket or other drive means 72 and 72' and chains 74 and 74'. This is more fully described in FIG. 7.

Figure 7:
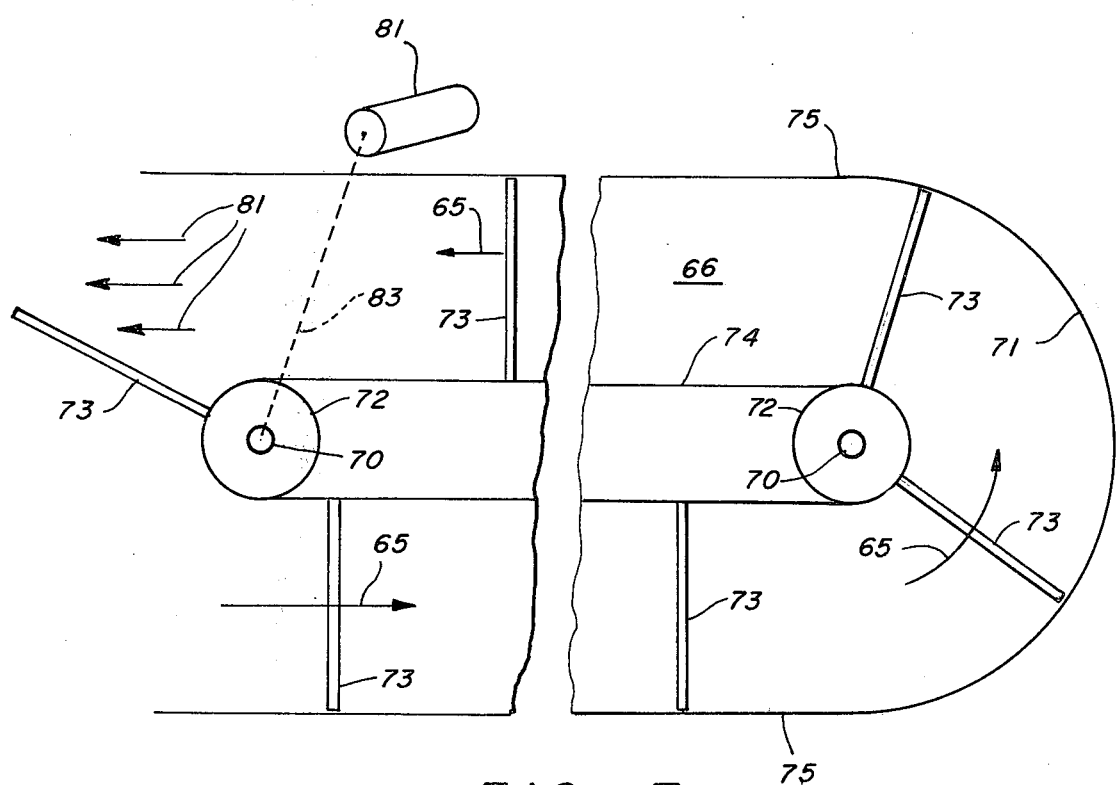
FIG. 7 illustrates in schematic form an apparatus for salvaging and accumulating the chips.

Refer now to FIG. 7. There is the shaft 70 and sprocket 72 at one end, and a corresponding shaft and sprocket at 72 at the other end of the machine and a chain 74 stretched between the two sprockets. At intervals along the chain there are arms 73 which are of light, rigid construction and of equal length. These are adapted to lie along the surface 66 of the lower floor 66 and the upper floor 68 and to be maintained in a direction substantially perpendicular to the length of the chain. As the drive motor 81 drives the sprocket 72 through means 83 the chain will go in a counterclockwise direction and will carry the arms 73 to the right as shown by arrows 65 and then will turn around and move in the opposite direction. As they move they will sweep up the chips on the surface 66 which will be delivered out of the end in accordance with arrows 81. It may be convenient to have a sheet metal wall 75 positioned close to the locus of the outside ends of the arms so that the chips will be swept up in the space within the guard wall 75. Other arrangements of chains and arms can, of course, be used depending on the shape of the area to be swept out. Returning now to FIG. 3 there is shown the vertical shaft 70, the sprockets 72 and 72', the chains 74 and 74' and the arms 73 and 73'.

Referring now to FIG. 4, there is shown the self-centering arms 32A, 32B and 33A, 33B, etc. The carriage 36 rests on the rail 34A on top of the wall 35.

One of a plurality of cutters 92A, 92B, 92C, are provided with conventional motor drive as is well-known, so that as the carriage and the log move to the right the log is rotated and the cutters will cut the outer surface of the log down to a selected diameter, depending on the position of the cutters 92. All of this is well-known in the art and need not be described in greater detail. By using a plurality of cutters the entire log can be cut to size with a minimum travel of the carriage and therefore a minimum amount of time for the operation of cutting the log. In other words, the log is cut in say four parallel cuts, in one-fourth the time it would take with a single cutter instead of say four cutters.

Shown in FIG. 4 is a fourth cutter wheel 91. This is positioned just beyond the end of the log 38, and just to the left of cutter wheel 92A. Cutter 91 cuts to a larger diameter than cutter 92A, and is used primarily for removing the bark and debris on the outside of the log. Then the cutter 92A provides a finishing cut.

The bark chips are of less market value than the white wood chips of the cutter 92A. In order to separate the bark chips from the white chips, a wall panel 85 is provided between the two cutters. The bark chips fall to the left onto floor 68. The white fall onto the floor 68A which is grill or slats so that they fall to the lower floor 66.

The chain 74' and arms 73' sweep up the bark chips on floor 68, while the chain 74 and arms 73 sweep up the white chips on floor 66, in the manner of FIG. 7, so that they can be collected separately.

In FIGS. 3 and 4, the floor 68' is a grill or slats to provide a walkway for the operators. The floor 68' need only extend from the left end of the machine (loading end) to the partition 85. Beyond the partition (to the right of that point) there is only the floor 66 to be cleared of chips, and the walkway 68A is a grill or slats. Even though most of the chips fall inside the support walls 35, the grill is still desirable.

If the separate collection of wood and bark chips is not desired, then the floor 68 would be a grill, and the floor 68', chain 74' and arms 73' would not be needed. In such a case, multiple cutter wheels 92A, 92B, 92C would be used with a consequent saving in cutting time.

The carriage 36 is shown with a structure 80 on one end and 86 on the other, each supporting a lathe center 82 on the left and 88 on the right. The center 82 is driven by means of chain 78 as shown in FIG. 3. The wheels 76 are shown in dashed outline which run on the rail 34. The cross arm 84 which supports the center 88 is carried on rails on the carriage and can be moved in accordance with the arrow 90 by means of a hydraulic cylinder, chain, or cable or any desired means. The purpose of this movement is to adapt the operation to various lengths of logs. In other words, after a log has been loaded into the notch 104 of the self-centering device, the carriage is positioned over the log with its left center slightly to the left of the log, the right center is then moved in to the other end of the log by means of the transport means 90. After it makes contact, hydraulic means inside of the part 86 is provided for pressing the centers 88 and 82 into the wood of the log. While the centers are being pressed in, of course, the cross arm 84 is locked to the carriage.

The carriage 36 can be traversed along the rails 34 by any conventional means such as screw, chain, cable, etc. Such means are well-known and need not be described in detail.

Figure 5:
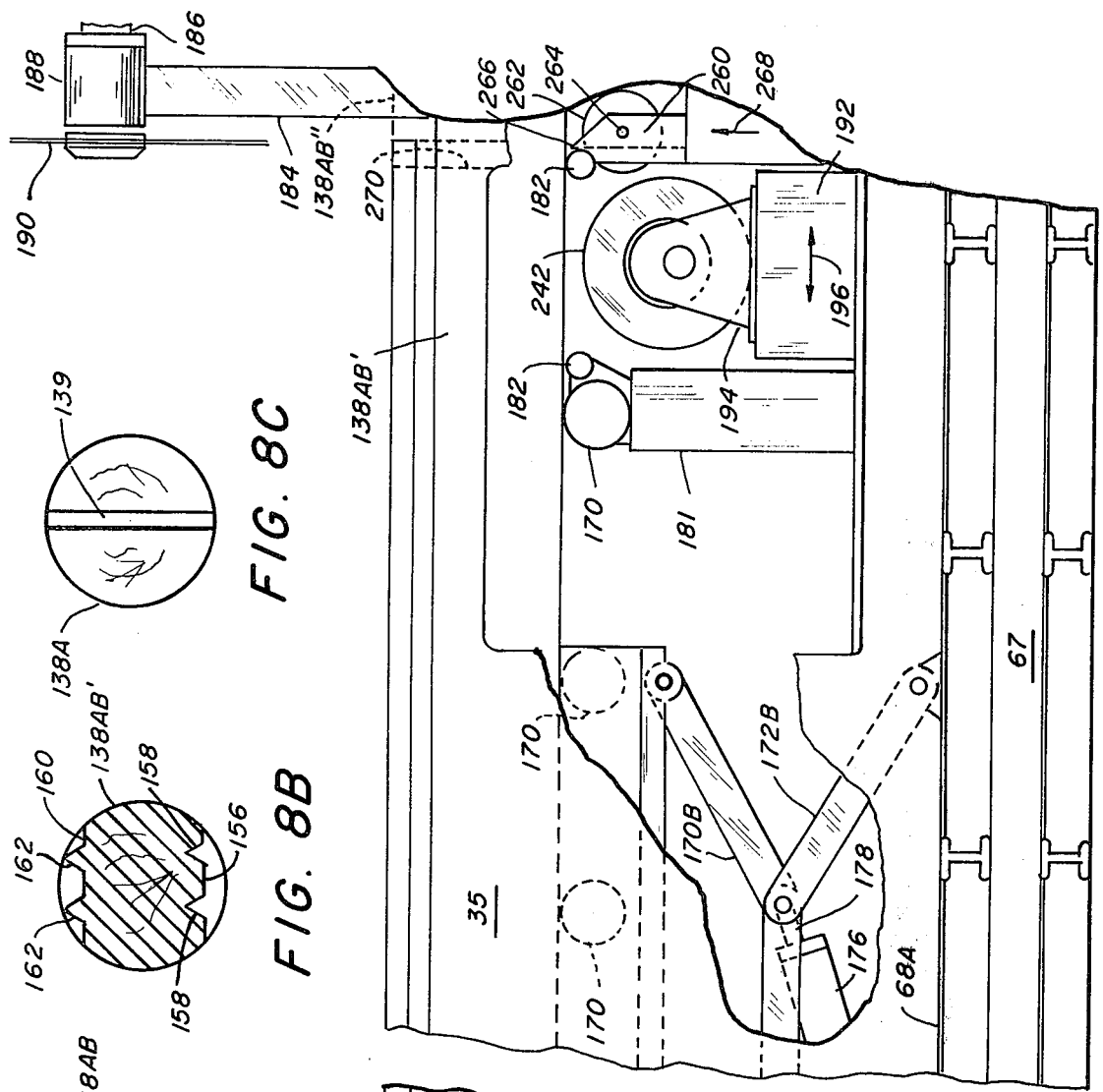
FIG. 5 illustrates the second portion of the machine in which the tongues and grooves are cut into the log and then lowered to the end preparation apparatus.
Figure 6:
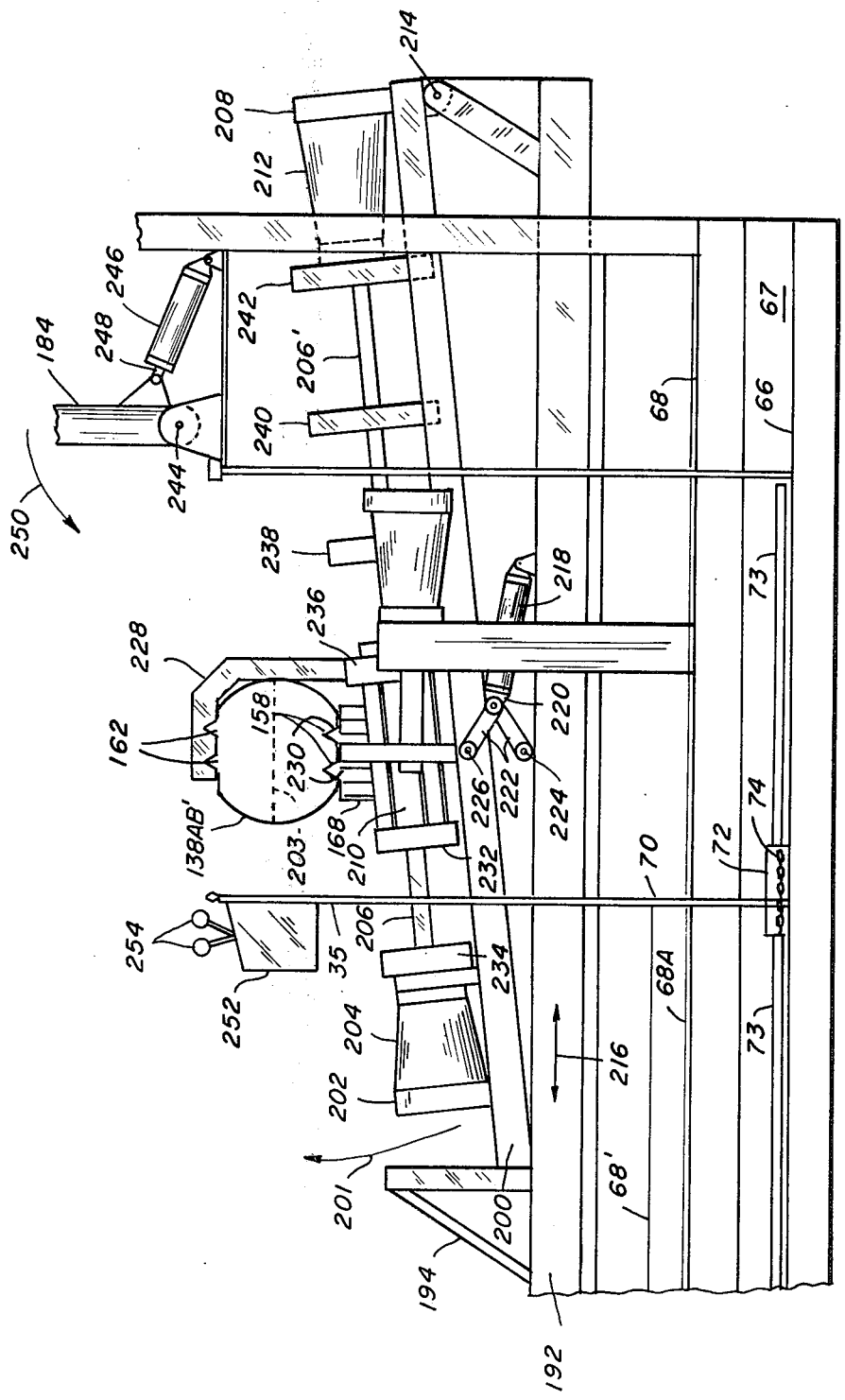
FIG. 6 illustrates details of the apparatus for cutting the saddle notches.

Referring now to FIGS. 5 and 6, there is shown in FIG. 5 an extension of the part shown in FIG. 4. FIG. 5 is the right hand end of the machine and would be indicated in FIG. 1 by the numerals 16 and 18.

The cutters 44 and 46 of FIG. 1 are shown at the left end of FIG. 5. These are the cutters 144 above and 138 below which are mounted in assemblies 142 above and 136 below. These are tied by means of columns 140 and 134, to appropriate self-centering apparatus, similar to that described in conjunction with parts 32 and 33. The motive power for adjusting the vertical separation of the two cutters can be provided by a hydraulic cylinder 130 and piston 132 with appropriate self-centering means such as the rack-and-pinion of FIG. 3, for example. The cutters are adjusted so that as they come together they will be equally spaced at all times above a plane which passes through the axis of the log.

After the cutters 144 and 138 have been operated, the log which is in a cylindrical form such as 138A of FIG. 8C will have appropriate tongues and grooves as may be shown in FIGS. 8A or 8B.

One type of construction is that shown in FIG. 8A in which there are flats 152 on top and 148 on bottom which match corresponding flats on logs above and below the log 38AB. The designation AB indicates that it is not only a round log like 138A in FIG. 8C, but further, has the machining of the flats and tongues and grooves. The tongue 154 on the top is slightly tapered as is the groove 150, cut upward into the bottom flat 148.

In FIG. 8B is shown a second version of the machined surfaces of the log. In this case, each of the tops and bottoms has two tongues and the bottoms have two grooves which are simply triangular in shape. It has been found that the two triangular tongues and two triangular grooves provide a better sealing, with less danger to cracking of the logs than is the case when the type of tongue groove of FIG. 8A is used.

After the cutters 144 and 138 have done their work, the carriage and the log are in the position all the way to the right end of the picture of FIG. 5. At this point there is a table 168 which carries horizontal rollers 170 which is movable up and down by means of the linkages 170A, 172A, 170B, 172B and 174. This is a parallel motion mechanism, and the operation of a hydraulic cylinder 176, for example, and piston 178 will permit the table to be raised or lowered in accordance with the position of the piston 178. When the carriage is at its rightmost position, the table is brought up into contact with the bottom surface of the log. The rollers 170 can, if desired, have appropriate ridges, corresponding to the grooves 158 in the bottom surface of the log so that as the table is brought up, the ridges fit into the grooves so that the log is held in a lateral direction. By lifting the table the weight of the log can be taken from the centers and handled by the table. When this adjustment is made the centers are then released and the table is then lowered, carrying the log below the level of the carriage, so that carriage can be traversed to the left, where it can then be loaded with a second log. The log 138AB or 138AB' is now loaded on the table 168.

Referring now to FIG. 6, there is shown in detail the apparatus for cutting appropriate portions of the log. The table 168 is shown with the two ridges 230 cut into rollers and the log is seated on the table so that the two notches are resting on the two ridges. There is a clamp arm 228 that has appropriate notches so that the two ridges 162 of the log 138AB' will fit into the notches, then by pulling down on the arm 228 the log is rigidly held to the table 168. When the arm 228 is lifted, it can be rotated to the right to permit the log to be transferred to the table 168.

The next operation is to cut the saddle notch which is in the under surface of the log, and extends halfway through the log. The saddle notch is a cylindrical cut of radius equal to that of the log on top of which this log is to seat. Since there may be many different sizes of logs the apparatus must be provided with cutters that can cut a plurality of sizes of cylindrical notch, such as for example, 6, 7, 8, 9, 10, 11, 12 inch diameters. The apparatus shown in FIG. 6 is adapted to do this.

There is a table 192 which is perpendicular to the longitudinal dimension of the carriage rails. It can be moved in the direction of the arrows 216 transverse to the carriage rails. It carries a table 200 which is hinged at point 214, to the table 192. A hydraulic cylinder 218, or other mechanism, and piston 220 with linkages 222 which are journalled at 224 and 226, can lift the left end of the table 200 in accordance with arrow 201. There is a cylindrical cutter 210 on shaft 206 driven by motor 204. In the upper position of the table 200, the surface of the cutter 210 will pass through the axis of the log 138AB'. When the cutter 210 is in position and the table is lifted, the cutter, driven by hydraulic or electric motor 204 supported on means 202 on the table 200 and rotated at high speed by means of shaft 206 will cut a saddle notch in accordance with the dashed line 203.

Let us assume that the log 138AB' is a 6 inch log and the dashed line 203 passes through the axis of the log. While the shaft 206 is horizontal, the circumference of the cutters 210 will be tangent to the plane 203. If the log happens to be 7 inch in diameter and resting on the table 168, its axis will be ½ inch higher than the plane 203. What is done, therefore, is to pass the 6 inch cutter up into the log which will cut a 6 inch diameter cylindrical cut but will be of smaller diameter than the 7 inch diameter required. On the shaft 206 are a plurality of short cutters 232, 234, 236, 238, 240 and 242. These are progressively of larger diameter being 7, 8, 9, 10, 11, and 12 inches, respectively. The cutter 232, 234, etc. are like counterbores, which cut only on their leading edge. What is done, therefore, is to cut the 6 inch diameter bore with the cutter 210, then move the table 216 to the right, where the cutting edge of the cutter 232 then enlarges the cut, by cutting away ½ inch greater radius in the form of a counterbore, until the cutting edge is passed completely through the log. The hole will now fit a 7 inch log. If the log is larger, say, 8 inches, the table 192 is moved still farther to the right, until the cutter 234 comes into contact and enlarges the hole by another ½ inch radius, after it has been passed along the table for the full width of the log.

In a similar way, each of the other cutters 236, 238, 240 and 242 can be passed successively through the saddle cut to enlarge it in steps of any desired size until the desired final diameter is reached.

This system of cutting is much more desirable than having a separate cylindrical cutter made for each of the several sizes, since such a set of cutters would be much more expensive than the simple set of counterbore cutters 232, 234, etc. Thus by the simple movement of the table 192 in accordance with arrow 216 to the right, and to the left the saddle cut can be made to any desired diameter in a very rapid manner.

The cutters 232, 234, etc. must all be separated by distances corresponding to the diameters of the largest logs, so that each cutter will be through the log before the next one begins to cut.

The shaft 206 from the motor 204 can be separate, or can be an extension of, the shaft 206' connected to the motor 212 on the right end of FIG. 6. If it is the same shaft, then only a single motor is required.

After the saddle cut is made, then the log is cut to precise length by means of a saw shown in FIG. 5, which is mounted on an arm 184 having a motor 188. In FIG. 6 this is shown in greater detail, where the arm 184 is rotated about an axis 294, and can be rotated counterclockwise in accordance with arrow 250, by means of a hydraulic cylinder 246 and piston 248, or by other means well-known in the art.

The operating station 252 is shown with controls 254 for operating the apparatus at the right end of the machine and indicated in FIG. 1 by numeral 50. In the lower part of FIG. 6 again is shown the shaft 70, the sprocket 72 and chain 74 with arms 73 which sweep out the chips created by the cutters, which have been described.

In FIG. 5 is shown another cutter 262 which is a cutting wheel, with a series of blades on its circumference, and is of appropriate width to cut the notch 139 shown in FIG. 18C. When the saw blade 190 comes down to cut the log 138AB', there are two portions; 138AB' on the left, and 138AB' on the right. It is assumed that both of these ends are to be cut with the vertical notch 139. The apparatus comprises the post 260, and the cutter 262 turning about the axis 264. The motor driving the cutter is not shown. The support 260 has a wedge point 266 which, as the support is moved upward, in accordance with arrow 268, spreads the two parts of the log, moving the part 138AB'' to the right an appropriate distance. As it does so, it cuts the vertical notches indicated by the dashed line 270, and a corresponding notch in the end of the log 138AB''.

No mechanism has been shown for moving the saddle cutting apparatus longitudinally in accordance with the arrows 196 of FIG. 5 along the machine, or transversely in accordance with arrows 216 across the machine. This can be done in many ways, including chain drives with appropriate drive motors, either electrical or hydraulic, or cable means, etc. which are well-known to the man skilled in the art. Appropriate speed controls will be provided for each of the motors so that the cutters and translators and so forth can be controlled so as to move at selected speeds, etc.

Figure 2:
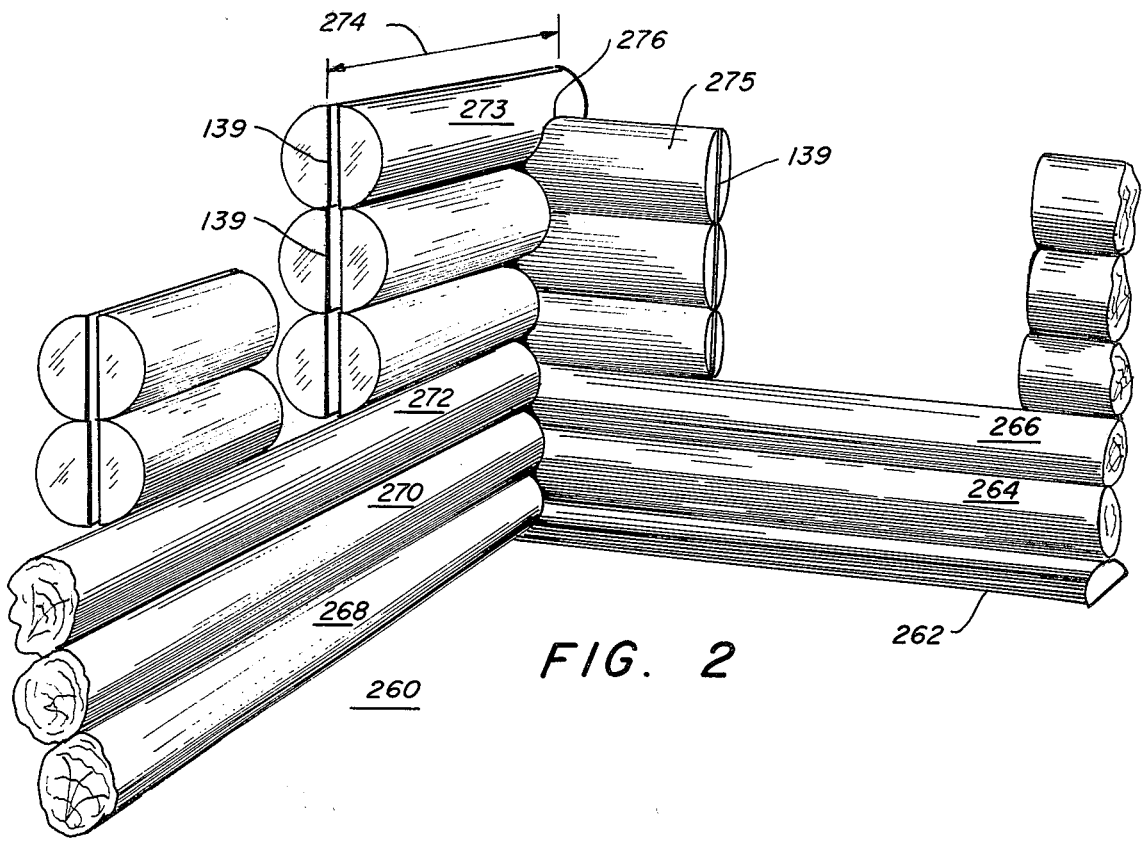
FIG. 2 illustrates a small detail of the log structure.

Referring now to FIG. 2 there is shown a small portion of a structure which might be constructed of logs prepared in accordance with this apparatus. The drawing does not provide all of the detail of the structure of the logs, but is designed mainly to show how the saddle cut 276 provides the means of locking the logs together at their ends. Also it shows the slots or grooves 139 in the ends of the logs, so that door jambs and window frames can be inserted, and held within the groove and provide weather proofing at the same time. The lowest log 268 on one side is matched with a half a log 262 at right angles. Correspondingly, at the top of the wall, there will be another half log corresponding to 262 on that wall.

The length of the log 273 shown as dimension 274 is longer than the distance from the left end to the center line of the log 275. The overhang is provided to have a full semicylindrical saddle notch, so as to provide large area of sealing contact between the two logs, 273 and 275.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

I claim:

1. A machine for the machining of logs, comprising:
  a. longitudinal frame means and carriage means movable along the top of said frame means, said carriage means, including:
  coaxial rotatable spaced center means for supporting a rough log at its ends;
  b. log positioning means at a first end of said frame for positioning a rough log in said carriage centers, with the axis of said log coaxial with said centers;
  c. means to move said carriage and rough log along said frame means toward the second end of said frame, and
  means for rotating said rough log;
  d. at least one rotating cutter means supported by said frame means adjacent the path of said log, whereby as said log rotates, said cutter will cut away bark and wood until the log is a cylindrical semi-finished log;
  e. two cutter means on self-centering means, one above and one below said semi-finished log in said carriage, said cutters adapted to cut at least one tongue along the top, and at least one groove along the bottom of said semi-finished log as the carriage carrying said semi-finished log is traversed past said two cutter means, while said semi-finished log is held rigid in said centers, whereby a nearly-finished log is provided;
  f. vertically adjustable table means near the second end of said frame for supporting said nearly-finished log while the centers holding it to said carriage means are released; and means to clamp said nearly-finished log to said table means; and
  g. means for lowering said table means so that said table and clamped log can be lowered below the level of said carriage, whereby said carriage can be moved to said first end.

2. The machine as in claim 1, including:
rotating cutter means for cutting a saddle notch in said nearly-finished log.

3. The machine as in claim 1, including:
saw means to cut square, the end of said nearly-finished log.

4. The machine as in claim 3, including:
rotating cutter means for cutting a vertical notch in the end of said log after said end is cut square.

5. The machine as in claim 2 in which said means to cut said saddle notch comprises:
  a. motor driven shaft means carrying a cylindrical cutter of a diameter corresponding to the minimum size log;
  b. said shaft means perpendicular to the axis of said log, and spaced from said log so that the surface of said cutter is tangent to a plane through the axis of said log.

6. The machine as in claim 5, including:
at least one short cutter of a larger diameter than said cylindrical cutter on said shaft; and
means to move said short cutter and shaft in the direction of said shaft, whereby said saddle cut is enlarged to the diameter of said short cutter.

7. The machine as in claim 5 in which said cutter and shaft means is mounted on a second table means which is adapted to be:
a. raised and lowered;
b. moved in the direction of said shaft means; and
c. moved in the longituding dimension of said nearly-finished log.

8. The machine as in claim 1 in which:
said table means carries a plurality of horizontally spaced rollers at its top, with axis transverse to the axis of said log, whereby
when said log is unclamped from said table means, said log can be moved longitudinally toward said second end of said frame.

9. The machine as in claim 8 in which:
said rollers have ridges which cooperate with at least one groove in the bottom surface of said log.

10. The machine as in claim 8, including:
transport means at said second end of said frame to receive said log from the rollers of said table means.

11. The machine as in claim 1 in which:
one of said two cutter means cuts a flat surface with a least one projecting longitudinal tongue, and the other cuts a flat surface with at least one longitudinal groove, matching said at least one projecting tongue.

12. The machine as in claim 11 in which:
said flat surfaces are parallel and spaced equally above and below the axis of said log.

13. The machine as in claim 12, including:
self-centering means to move one cutter up a selected distance and to simultaneously move the other cutter down an equal distance.

14. The machine as in claim 1, including:
first cutter means positioned to cut substantially only bark, and second cutter means to cut only white wood; and
means to separately collect the bark chips and the white wood chips produced by said two cutter means respectively.

15. The machine as in claim 14, including:
means to sweep chips from a floor of said machine including:
a. spaced apart parallel vertical shafts and sprockets on each shaft adjacent said floor;
b. loop chain means around said sprockets;
c. arm means resting on said floor, attached at one end to and perpendicular to said chain; and
d. means to rotate one shaft.

16. The machine as in claim 1 in which said log positioning means comprises:
a pair of spaced support means each comprising;
1. a lower jaw means and an upper jaw means, adapted to clamp a log between said jaws such that the axis of said log will be substantially at the midpoint between said jaws;
2. means to move the lower jaw up a selected distance; and
3. means to simultaneously move the upper jaw down a selected distance.

17. The machine as in claim 16 in which:
said means to simultaneously move both said jaws comprises
fixed pinion means, intermeshing with rack means on each of said jaws, said rack means meshing on opposite sides of said pinion means.

18. The method of machining a rough log to form a finished log for building log buildings, comprising:
a. supporting a rough log with its axis horizontal and at a selected elevation;
b. clamping said rough log in centers in a carriage surrounding said log, said centers at the ends of the axis of said log;
c. rotating said log in said centers while moving said carriage longitudinally in the direction of said axis, while rotating at least one chip cutter spaced from said axis;
whereby said log will be cut to a cylindrical surface;
d. holding said log fixed in its centers while moving said carriage longitudinally, while applying a first cutter to the top of said log and a second cutter to the bottom of said log, said cutters equally spaced above and below the axis of said log;
whereby said cutters cut a flat surface on top and bottom of said log, with at least one longitudinal tongue projecting from one surface and a corresponding groove cut into the second surface;
e. raising a table to support said log, while releasing said centers, to free said log from said carriage, and clamping said log to said table.

19. The method as in claim 18, including:
the additional step of cutting a saddle notch in said log.

20. The method as in claim 18, including:
the additional step of cutting said log to a selected length.

21. The method as in claim 20, including:
the step of cutting a vertical notch in the cut end of said log.

* * * * *